United States Patent
Le Ravalec-Dupin et al.

(10) Patent No.: US 7,483,822 B2
(45) Date of Patent: Jan. 27, 2009

(54) METHOD INTENDED FOR GRADUAL, DEFORMATION OF A BOOLEAN MODEL SIMULATING A HETEROGENEOUS MEDIUM, CONSTRAINED TO DYNAMIC DATA

(75) Inventors: Mickaële Le Ravalec-Dupin, Rueil Malmaison (FR); Lin-Ying Hu, Rueil Malmaison (FR)

(73) Assignee: Institut Francais du Petrole, Malmaison Cedex (FR)

( * ) Notice: Subject to any disclaimer, the term of this patent is extended or adjusted under 35 U.S.C. 154(b) by 746 days.

(21) Appl. No.: 10/893,390

(22) Filed: Jul. 19, 2004

(65) Prior Publication Data

US 2005/0015226 A1    Jan. 20, 2005

(30) Foreign Application Priority Data

Jul. 18, 2003   (FR)   ................................. 03 08841

(51) Int. Cl.
*G06G 7/48*   (2006.01)
*G06F 17/10*   (2006.01)
(52) U.S. Cl. ................................. 703/10; 703/2; 702/12
(58) Field of Classification Search .................... 703/2, 703/10; 702/11, 12, 13, 6, 14
See application file for complete search history.

(56) References Cited

U.S. PATENT DOCUMENTS

| 6,618,695 | B1 * | 9/2003 | Hu et al. | 703/2 |
| 6,662,109 | B2 * | 12/2003 | Roggero et al. | 702/6 |
| 6,813,565 | B1 * | 11/2004 | Hu et al. | 702/14 |
| 2002/0013687 | A1 * | 1/2002 | Ortoleva | 703/10 |

(Continued)

FOREIGN PATENT DOCUMENTS

FR    2 795 841    1/2001

(Continued)

OTHER PUBLICATIONS

Hipel et al., K.W. Decision Making in an Uncertain World: Information-Gap Modeling in Water Resources Management, IEEE Transactions on Systems, Man, and Cybernetics—Part C: Applications and Reviews, vol. 29, No. 4, Nov. 1999, pp. 506-517.*

(Continued)

*Primary Examiner*—Russell Frejd
(74) *Attorney, Agent, or Firm*—Antonelli, Terry, Stout & Kraus, LLP.

(57) ABSTRACT

A method intended for gradual deformation of a Boolean model allowing best simulation of the spatial configuration, in a heterogeneous underground zone, of geologic objects defined by physical quantities. The model is optimized by means of an iterative optimization process from realizations including objects whose number is a random Poisson variable of determined mean, and by minimizing an objective function. In order to impose a continuity in the evolution of the objects in size, number, positions, within the model, a combined realization obtained by combining on the one hand an initial realization comprising a number of objects corresponding to a first mean value and at least another independent realization having another number of objects corresponding to a second mean value is constructed. An application is construction of a Boolean underground reservoir model allowing simulation of the configuration of heterogeneities such as fractures, channels, etc.

4 Claims, 3 Drawing Sheets

U.S. PATENT DOCUMENTS

2002/0120429 A1* 8/2002 Ortoleva ........................ 703/2
2003/0028325 A1* 2/2003 Roggero et al. ............... 702/11

FOREIGN PATENT DOCUMENTS

FR 2 821 946 9/2002

OTHER PUBLICATIONS

Giles et al., J.E. Techniques for the Deveeloopment of a Multi-Objective Optimization Model, Proceedings of the 16th Annual Southeast Regional Conference ACM-SE 16, Apr. 1978, pp. 64-67.*

Kanney et al., J.F. Convergenece of Iterative Split-Operator Approaches for Approximating Nonlinear Reactive Transport Problems, Advances in Water Resources, vol. 26, Iss. 3, Mar. 2003, pp. 247-261.*

Hu Lin Y; History Matching of Object-Based Stochastic Reservoir Models; 2003; pp. 1-12.

Lin, Y. Hu; Gradual Deformation and Iterative Calibration of Gaussian-Related Stochastic Models[1]; 2000; pp. 87-108.

Ravalec-Dupin Le M. et al. ; Optimization with the Gradual Deformation Method[1]; Feb. 2002; pp. 125-142.

* cited by examiner

METHOD INTENDED FOR GRADUAL, DEFORMATION OF A BOOLEAN MODEL SIMULATING A HETEROGENEOUS MEDIUM, CONSTRAINED TO DYNAMIC DATA

BACKGROUND OF THE INVENTION

1. Field of the Invention

The present invention relates to a method of gradual deformation of a Boolean model simulating a heterogeneous medium, constrained to dynamic data.

2. Description of the Prior Art

The following documents mentioned in the description hereafter illustrate the state of the art:

Chilès, J. P., and Delfiner, P., 1999, Geostatistics: Modeling Spatial Uncertainty, Wiley, New York, 695p., Hu, L.-Y., 2000a, Gradual Deformation and Interative Calibration of Gaussian-Related Stochastic Models, *Math. Geol.*, 32(1), Hu, L.-Y., 2000b, Gradual Deformation of Non-Gaussian Stochastic Models, Geostats 2000 Cape Town, W J Kleingeld and D G Krige (eds.), 1, 94-103, Hu, L.-Y., 2003, History Matching of Object-Based Stochastic Reservoir Models, SPE 81503, Journel, A., and Huijbregts, C. J., 1978, Mining Geostatistics, Academic Press, London, 600p., Le Ravalec, M., Noetinger, B., and Hu, L.-Y., 2000, The FFT Moving Average (FFT-MA) Generator: An Efficient Numerical Method for Generating and Conditioning GaussianSimulations, *Math. Geol.*, 32(6), 701-723, Le Ravalec, M., Hu, L.-Y., and Noetinger, B., 2001, Stochastic Reservoir Modeling Constrained to Dynamic Data: Local Calibration and Inference of the Structural Parameters, *SPE Journal*, 25-31.

Various methods based on a gradual deformation scheme are described in the assignee's French patents 2,780,798, 2,795,841, and 2,821,946, and in French patent applications 02/13,632 or 03/02,199.

Realizations of Gaussian or Gaussian-related stochastic models are often used to represent the spatial distribution of certain physical properties, such as permeability or porosity, in underground reservoirs. Inverse methods are then commonly used to constrain these realizations to data on which these methods depend in a non-linear manner. This is notably the case in hydrology or in the petroleum industry. These methods are based on minimization of an objective function, also referred to as cost function, which measures the difference between the data measured in the field and the corresponding responses numerically simulated for realizations representing the medium to be characterized. The goal is to identify the realizations associated with the lowest objective function values, that is the most coherent realizations as regards the data.

The gradual deformation method was introduced in this context (see Hu, 2000a; Le Ravalec et al., 2000). This geostatistical parameterization technique allows gradual modifications of the realizations from a limited number of parameters. It is particularly well-suited to minimization problems because, when applied to realizations, it induces a continuous and regular variation of the objective function. In fact, minimization can be performed from the most advanced techniques, that is gradient techniques. The gradual deformation method has proved efficient for constraining oil reservoir models to production data (See Le Ravalec et al., 2001).

The gradual deformation method initially set up for Gaussian models has afterwards been extended to non-Gaussian models (See Hu, 2000b) and more particularly to object or Boolean models. These models are used to describe media comprising for example channels or fractures. The channels or fractures are then considered as objects. An algorithm has been proposed to simulate the gradual migration of objects in space, that is the gradual displacement of objects in space. For a realization of an object model, this type of perturbation translates into a smoothed variation of the objective function, as for Gaussian models. This algorithm has then been generalized to the non-stationary and conditional Boolean model (See Hu, 2003). Besides, still using the gradual deformation of Gaussian laws, solutions allowing progressive modification of the number of objects that populate a model are proposed (See Hu, 2003), this number being representative of a Poisson's law. However, one limit of these developments is that the objects appear or disappear suddenly, which can generate severe discontinuities of the objective function and make the gradient techniques conventionally used for carrying out the minimization process difficult to implement.

Gradual Deformation: Reminders

Multi-Gaussian Random Function

The gradual deformation principles that have been proposed to date apply to multi-Gaussian random functions. Let there be, for example, two independent random functions $Y_1(x)$ and $Y_2(x)$, multi-Gaussian and stationary of order 2 with x being the position vector. These two functions are assumed to have the same means and variances, i.e. 0 and 1, and the same covariance function. A new random function $Y(t)$ is then constructed by combining $Y_1$ and $Y_2$ according to the expression as follows:

$$Y(t) = Y_1 \cos(t) + Y_2 \sin(t).$$

It can be shown that, whatever t, Y has the same mean, variance and covariance model as $Y_1$ and $Y_2$. Besides, Y(t) is also a multi-Gaussian random function because it is the sum of two multi-Gaussian random functions.

According to this combination principle, a chain of realizations y(t) depending only on deformation parameter t can be constructed from two independent realizations $y_1$ and $y_2$ of $Y_1$ and $Y_2$. The basic minimization processes use gradual deformation to explore the chain of realizations and to determine the deformation parameter providing the realization which is the most compatible with the data measured in the field, that is the pressures, production rates, breakthrough times, etc. Since exploration of a single chain of realizations does generally not allow identification of a realization providing a sufficiently small objective function, the desired process is iterated. The optimum realization determined for the $1^{st}$ chain is then combined with a new independent realization of $Y_2$, and a new chain of realizations whose exploration can provide a realization which reduces the objective function even further is deduced therefrom, etc.

Poisson Point Process

The key element of Boolean models is a Poisson point process which characterizes the spatial layout of the objects. A base Boolean model is considered for which the objects have the same shape and are randomly and uniformly distributed in space. The positions of these objects are distributed according to the Poisson point process of constant density. In other words, the position of an object in space with n dimensions $[0,1]^n$ is defined by vector x whose n components are uniform numbers drawn independently according to the uniform distribution law between 0 and 1.

The objects migration technique (See Hu, 2000b) gradually deforms the position of the objects. The position of an object is determined by uniform numbers. First and foremost, these uniform numbers are converted to Gaussian numbers:

$$Y=G^{-1}(x).$$

G is the standard normal distribution function. Let $x_1$ be the initial position of a given object and $x_2$ another possible position, independent of $x_1$. A trajectory is defined for the object by combining the Gaussian transforms of these two positions according to the gradual deformation method:

$$x(t)=G[G^{-1}(x_1)\cos(t)+G^{-1}(x_2)\sin(t)]$$

It can be shown that, for any value of deformation parameter t, x is a uniform point of $[0,1]^n$. When the two positions $x_1$ and $x_2$ are fixed, the trajectory is completely determined. A two-dimensional example is shown in FIG. 1.

The object migration technique is a first move towards the gradual deformation of Boolean simulations. One of its limits is that the number of objects is assumed to be constant during deformation. Solutions have been proposed to progressively modify the number of objects that populate a model (See patent application N-01/03,194 or Hu, 2003 mentioned above). However, one limit of these developments is that the objects appear or disappear suddenly, which can generate severe discontinuities of the objective function. The gradual deformation method according to the invention allows, as described below, to reduce this discontinuity and thus to facilitate the implementation of gradient-based optimization techniques.

SUMMARY OF THE INVENTION

The method according to the invention allows gradual deformation of a Boolean model allowing to best simulate the spatial configuration, in a heterogeneous underground zone, of geologic objects defined by physical quantities, that is constrained to measured dynamic data representative of fluid displacements in the medium, and by imposing a continuity in the evolution of the objects. The method comprises carrying out an iterative optimization process from realizations each including at least one of the objects whose number is drawn from a Poisson random variable of determined mean, and minimization of an objective function measuring the difference between real dynamic data and the dynamic data simulated by means of a flow simulator from a combined realization, by adjustment of combination coefficients, the iterative adjustment process being continued until an optimum realization of the stochastic model is obtained.

The method according to the invention notably applies to the construction of a model for representing the spatial distribution, in an underground zone, of some physical properties of the medium such as the permeability, the porosity, etc.

The method comprises, upon each iteration constructing:

a combined realization obtained by combination, on the one hand, of an initial realization of N1(t) objects corresponding to a first mean value and of at least a second independent realization of the same model of N2(t) objects corresponding to a second mean value, the combination being such that the number N(t) of objects of the combination has a mean value equal to a sum of the first and of the second mean value.

According to an implementation mode, upon each iteration and for the same mean value of the combination, the first and second mean values are varied together so as to gradually vary a number and size of objects from each one of the combined realizations.

In other words, the method allows gradual modification of the number of objects that populate a Boolean model and, notably, to consider a new Boolean model construction technique with, now, progressive appearance and disappearance of the objects.

This method allows attenuation of the discontinuities of the objective function in an inversion procedure and consequently facilitates setting up of the gradient-based optimization algorithms.

The gradual deformation, which is applied to the Poisson random variables, makes gradual deformation of the number of objects that populate Boolean simulations possible. Furthermore, the size of the objects is associated with the Poisson process used to generate the number of objects of a Boolean simulation, which leads to an algorithm allowing making an object progressively appear or disappear during deformation of a Boolean realization. The possible discontinuities of the objective function are thus reduced. These algorithms are easy to implement and can be combined with an optimization algorithm to calibrate Boolean type reservoir models with production data, pressure, breakthrough time, etc.

Unlike the Gaussian type reservoir model, the discontinuity of an objective function is intrinsic in the object type reservoir model. In some cases, displacement of an object by a single grid cell can cause a sudden change in the convexity of the model and, consequently, a radical change in the hydrodynamic behaviour of the model. By making an object progressively appear or disappear in a Boolean simulation, the discontinuity is not eliminated, but is attenuated. The implementation of gradient-based optimization algorithms is facilitated.

BRIEF DESCRIPTION OF THE DRAWINGS

Other features and advantages of the method and of the device according to the invention will be clear from reading the description hereafter of a non limitative embodiment example, with reference to the accompanying drawings wherein.

DETAILED DESCRIPTION OF THE INVENTION

Figure 1:
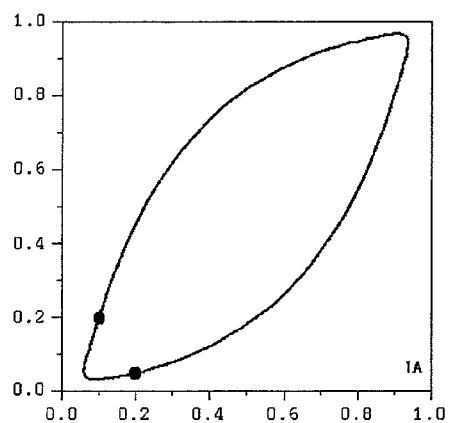
FIG. 1 shows an example of trajectory defined from two points in $[0,1]^2$.

Gradual Deformation of the Number of Objects

The objects migration technique is a first move towards gradual deformation of Boolean simulations. One of its limits is that the number of objects is assumed to be constant during deformation. Solutions are disclosed to progressively modify the number of objects that populate a model (See patent application N-01/03,194 or Hu, 2003 mentioned above). However, one limit of these developments is that the objects appear or disappear suddenly, which can generate severe discontinuities of the objective function. The gradual deformation method according to the invention allows, as described below, reduces this discontinuity and thus facilitates the implementation of gradient-based optimization techniques.

Poisson's Law

Our objective is to gradually deform the number of objects for a Boolean simulation. This number is a random number and follows a Poisson's law, i.e. the probability for this (non-negative) number to be n is:

$$P(N = n) = \exp(-\lambda)\frac{\lambda^n}{n!}$$

where $\lambda$ is the mean and the variance of the Poisson variable N.

A possible technique for simulating a Poisson variable is to generate a Poisson process of mean 1 over a period equal to $\lambda$, since the number of events occurring during this period follows a Poisson's law of parameter $\lambda$. Independent intervals $OE_1, E_1E_2, \ldots E_n E_{n+1}$ (FIG. 2) are therefore successively generated according to an exponential law of mean equal to 1 (law $y_1$), and their values are added until $\lambda$ is exceeded. The distribution function of a variable X according to the exponential law of mean 1 is expressed as follows:

$$F(x)=1-\exp(-x).$$

If r is a random number uniformly distributed between 0 and 1, 1−r is also uniformly distributed over [0;1]. then set 1−r=1−exp(−x). In fact, simulation of the successive segments just requires repeating x=−Log(r) for different r. The realization n of the Poisson variable N is then the highest integer n such that:

$$\sum_{i=1}^{n} -\mathrm{Log}(r_i) < \lambda$$

or, which is equivalent, but more economical as regards calculation:

$$\prod_{i=1}^{n} r_i > \exp(-\lambda).$$

On the other hand, this second formulation is undoubtedly more numerically unstable when $\lambda$ is high.

Gradual Deformation of Poisson Variables

The gradual deformation principles presented above apply to Gaussian numbers that vary continuously in $\mathfrak{R}$. The Poisson variables being integers, these principles do not apply as things are.

Figure 3:
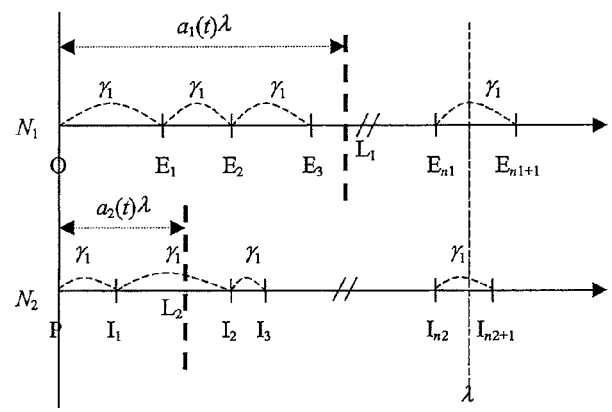
FIG. 3 shows an example of gradual deformation of a Poisson variable of mean $\lambda$ by combining two independent Poisson variables $N_1$ and $N_2$.

The sum of two independent Poisson variables of parameter $\lambda$ for one and $\mu$ for the other still is a Poisson variable, but of parameter $\lambda+\mu$. This fundamental result lies at the root of the gradual deformation algorithm of the invention. Let $N_1$ and $N_2$ be two independent Poisson variables of parameter $\lambda$ (See FIG. 3). The parameters of these two added variables are gradually deformed, but while respecting at any time the fact that the sum of the parameters is $\lambda$. To prevent any confusion between the parameter of the Poisson variables and the deformation parameter, reference is made to mean and deformation parameters. A new Poisson variable N(t) of mean $\lambda$ is constructed from:

$$N(t)\{\lambda\}=N_1\{a_1(t)\lambda\}+N_2\{a_2(t)\lambda\}$$

with $$\sum_{i=1}^{2} a_i = 1. \; a_i(t)\lambda$$

is the mean of variable $N_1$ at the time of the combination (See FIG. 3). For example $a_1=\cos^2(t)$ and $a_2=\sin^2(t)$ is selected. This parameterization is readily extended to n dimensions:

$$N(t)\{\lambda\} = \sum_{i=1}^{n} N_i\{a_i(t)\lambda\} \text{ with } \sum_{i=1}^{n} a_i = 1,$$

and affords the advantage of being periodic.

Trigonometric functions can for example be selected for coefficients $a_i$.

Figure 4:
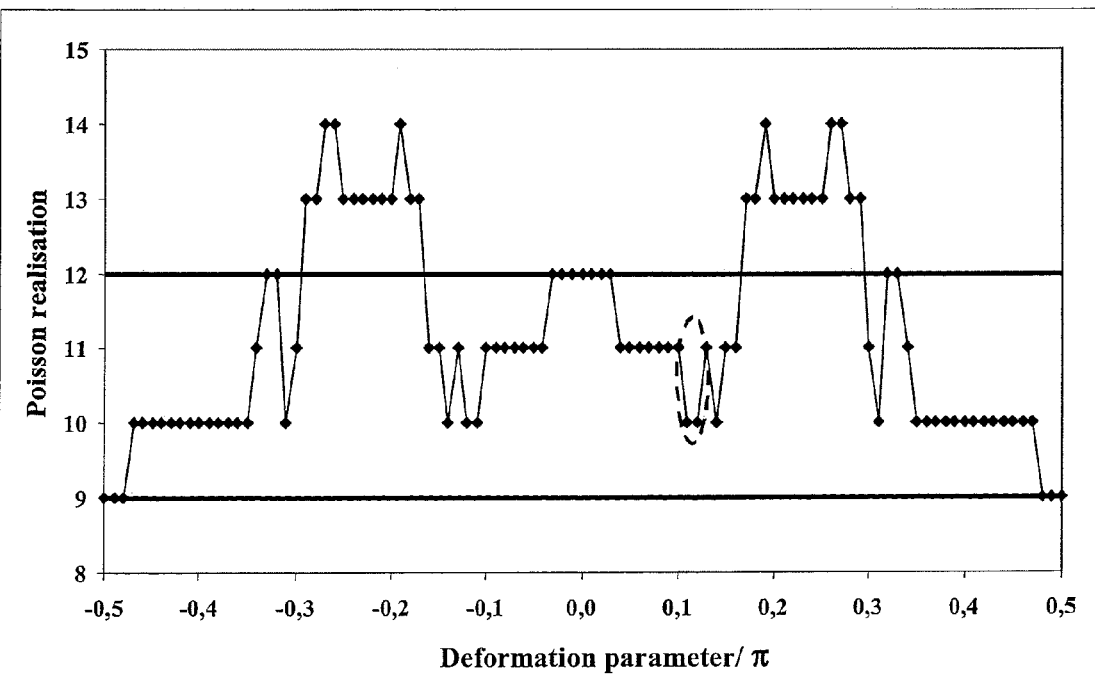
FIG. 4 shows an example of gradual deformation of a Poisson realization for a variable of parameter 10.

By varying deformation parameter t, the mean of the added variables is modified, which affects the realizations of these variables. Their sum thus also changes. By following this deformation principle, a chain of realizations n(t) depending only on deformation parameter t can be constructed from two realizations n1 and n2 of $N_1$ and $N_2$. When t is equal to 0, the realization of N is $n_1$; when t is equal to $$\pm\frac{\pi}{2},$$

the realization of N is $n_2$. It can be shown that N(t) is periodic of period $\pi$. FIG. 4 illustrates this deformation principle for a Poisson variable of mean 10. When the deformation parameter divided by $\pi$ is 0, the realization is the same as the realization initially considered ($n_1$=12). When it is ±0.5, the realization is the same as the second realization considered for combination ($n_2$=9). Another approach could be considered for gradually deforming a Poisson variable of parameter $\lambda$. This approach displaces a segment of length $\lambda$ on a line constructed from the addition of an infinity of segments of lengths obtained by means of a law $\gamma_1$. The number of complete segments fitting into the segment of length $\lambda$ would be a realization of the Poisson variable and would vary with the position of this segment.

Successive Construction of Deformation Chains

In the case of Gaussian realizations, the gradual deformation method is naturally integrated in the minimization processes. This is translated into a successive exploration of Gaussian realization chains constructed from an initial realization which corresponds to the optimum determined for the previous chain and from a second Gaussian realization randomly generated for each chain.

For the Poisson numbers, a similar procedure is followed. Gradual deformation, according to the principles specified in the previous section, of two realizations of a Poisson's law, one referred to as initial and the second as complementary, provides a first chain. Exploration of this chain leads to the identification of an "optimum" realization which minimizes the objective function. This realization is then used as an initial realization for creating a new chain. This new chain also requires a new complementary realization, generated independently. Again, exploration of this new chain can allow to reduce the objective function further. This seek process is iterated until the objective function is considered to be sufficiently small.

Progressive Appearance and Disappearance of an Object

The gradual deformation principle discussed above allows perturbing, during an optimization, the number of objects that populate a Boolean simulation. Clearly, the sudden appearance or disappearance of objects is likely to induce a sudden variation of the objective function. Now, optimizations based on gradient calculations require a continuous evolution of the objective function. A new type of Boolean model providing progressive appearance and disappearance of objects is used.

Principle

Reference is made to the generation of a Poisson number n from a Poisson process. The method discussed above (See FIG. 2) places segments end to end until a length exceeding parameter $\lambda$ of the Poisson variable is obtained wherein n is the integer such that $OE_n < \lambda$ and $OE_{n+1} > \lambda$.

A point is denoted such that the length of segment $OL_1$ is equal to the mean of the Poisson variable by $L_1$ (See FIG. 3). During the deformation process, this point moves. At t+0, for variable $N_1$, $OL_1 = \lambda$. Segment $OL_1$ then comprises $n_1$ complete segments $(OE_1, E_1E_2, \ldots E_{n1-1}E_{n1})$ and a $(n_1+1)^{th}$ truncated segment $(E_{n1}L_1)$. It is deduced therefrom that the Boolean simulation is populated with $n_1+1$ objects of determined size, surface or volume from the anamorphosed lengths of segments $OE_1, E_1E_2, \ldots E_{n1}L_1$. For simplification reasons, the term size of objects is used in the description below. If the deformation parameter t is increased, segment $OL_1$ is reduced and is the same for $E_{n1}L_1$. Consequently, the size of the $(n_1+1)^{th}$ object decreases: the object disappears progressively. If the mean of variable $N_1$ continues to decrease, the $n_1^{th}$ object also starts to reduce, etc. At the same time, the mean of variable $N_2$ increases. The realization for this variable is first 0, then a first object progressively appears. Its size is controlled by the length of segment $PL_2$, where point $L_2$ is for $N_2$ which is the equivalent of $L_1$ for $N_1$. When $PL_2 = PI_1$, the first object is complete. If the mean of $N_2$ continues to increase, a second object appears. Its size now depends on the length of segment $I_1L_2$.

Figure 5:
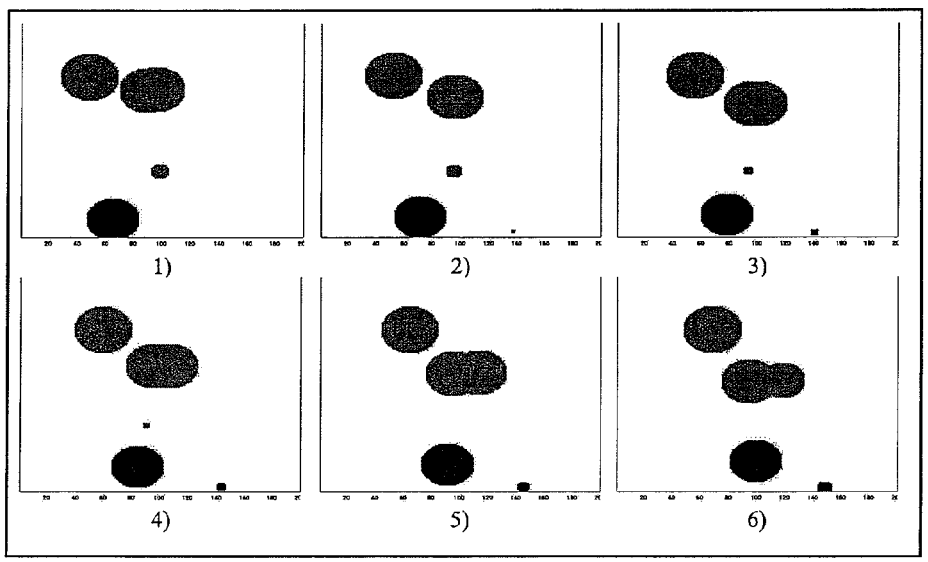
FIG. 5 shows an example of gradual deformation of the number and of the position of the objects with progressive appearance and disappearance. The small grey ellipse disappears and a black ellipse appears.

FIG. 5 illustrates the method. Two families of objects, black ellipses and grey ellipses, can be seen. The color difference lies in the fact that the objects considered are obtained from two Poisson variables, $N_1$ and $N_2$. The position of the ellipses varies gradually; the ellipses appear and disappear progressively. Image 1 shows 4 grey ellipses, 3 large ones (two are more or less superposed) and a small one; the latter is appearing. A black ellipse and a black point, which indicates the appearance of a new black ellipse, can also be observed. In images 2 to 5, the small grey ellipse becomes increasingly small until it is reduced to a point. At the same time, the small black ellipse increases. In image 6, the small grey ellipse has totally disappeared. Another grey ellipse now starts to reduce. The small black ellipse becomes slightly larger.

As above, the same type of gradual deformation could be simulated by moving a segment of length $\lambda$ on a line constructed from the addition of an infinity of segments of lengths obtained by means of a law $\gamma_1$. This segment of length $\lambda$ would comprise complete segments in the center and, at the ends thereof, a segment that would tend to increase and another one that would exhibit the opposite behavior.

Impact on the Objective Function

Figure 6A:
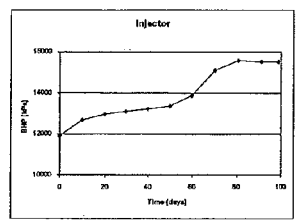
FIG. 6 shows an example of reference model in the center, injection well bottomhole pressure on the left and producing well fractional flow on the right.
Figure 6B:
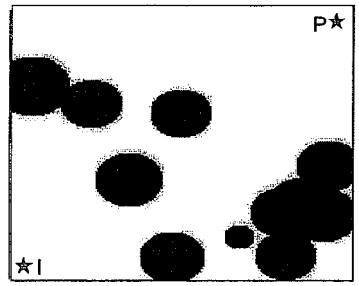
Figure 6C:
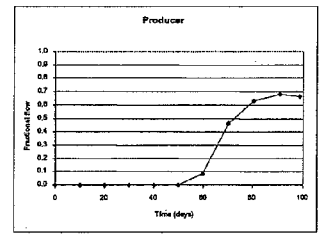
Figure 7:
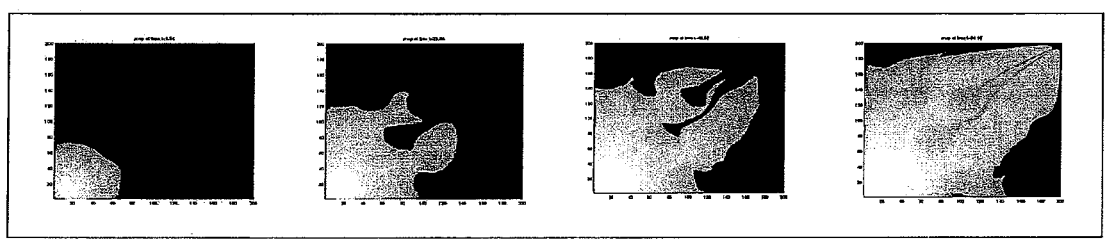
FIG. 7 shows an example of reservoir invasion by the water injected.

By way of example, a synthetic reservoir model in FIG. 6 is considered. The reservoir of a reservoir rock of permeability 500 mD and of low-permeability lenses of permeability 50 mD. The lenses are shown by ellipses. For simplification reasons, the porosity is assumed to be constant and equal to 30% everywhere. The model is discretized on a 200×200-cell grid, of length 1 m along the X-axis and 0.8 m along the Y-axis. For this initially oil-saturated reservoir, the following test is carried out by means of the 3DSL flow simulator. Water is injected at 100 m$^3$/day for 100 days in well I and oil is produced at constant pressure in well P. The injection well bottomhole pressure and the producing well fractional water flow are shown in FIG. 6. These data are referred to as reference data because they relate to the reference model. The water invasion is illustrated in FIG. 7 for different times. The lenses initially form a flow barrier, then they gradually become water-saturated.

It is assumed that nothing is known about the position and the number of the lenses. Knowing only the injection well pressure response and the producing well water response, an attempt is made to identify a reservoir model as coherent as possible with these data. It is assumed that information from geology for example allows approximation of the number of lenses from a Poisson's law of parameter 10. By applying the gradual deformation processes as discussed above, a chain of Boolean simulations is constructed characterized by the gradual variation of the number of ellipses and their position. The gradual deformation of the size of the ellipses could also be considered. For all these simulations, the injection test is simulated numerically and an objective function measuring the difference between the reference data and the simulated data (FIG. 8) is deduced therefrom. Deformation parameter t controls both the deformation of the number of ellipses and their position. The gradual deformation relations are such that a complete period is explored with t ranging between $-\pi/2$ and $+\pi/2$. Two cases are examined. The ellipses appear and disappear suddenly for the first one, and progressively for the second. In the first case, the objective function sometimes evolves with jumps. The jumps are checked to be absent or at least greatly attenuated in the second case. The variation of the number of objects as a function of the deformation parameter throughout the chain is described in FIG. 4: this number is the one that is obtained for sudden ellipse appearances and disappearances.

Figure 2:
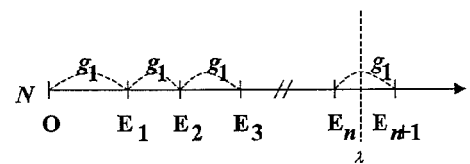
FIG. 2 shows a simulation of a realization n for a Poisson variable of parameter $\lambda$.
Figure 8:
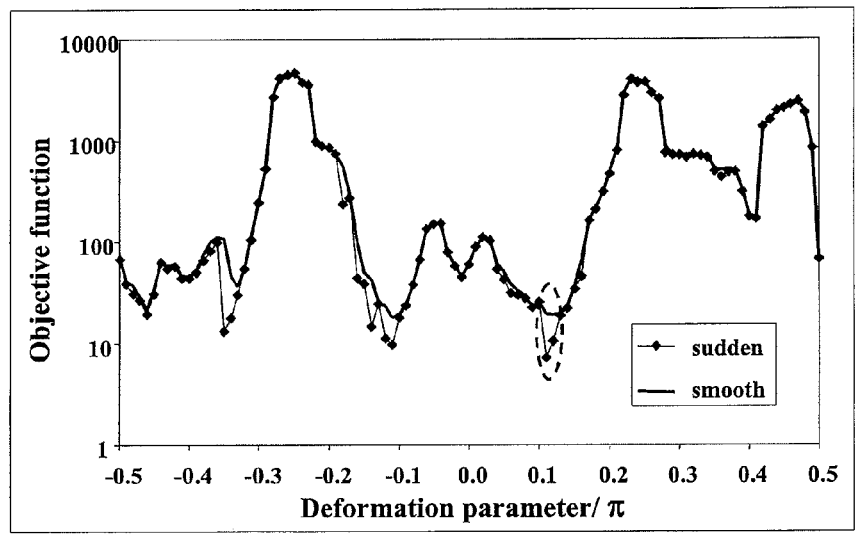
FIG. 8 shows the evolution of the objective function when the deformation parameter describes a chain.
Figure 9:
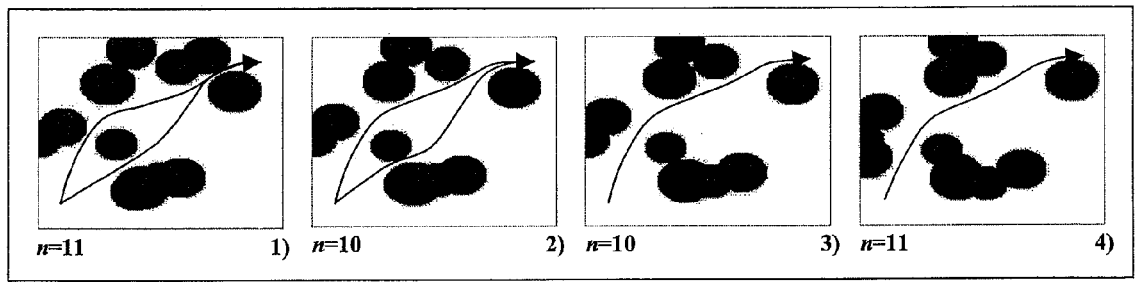
FIG. 9 shows an example of gradual deformation of the number and of the position of the objects with sudden appearance and disappearance; this chain corresponds to the four points circled in FIG. 8.
Figure 10:
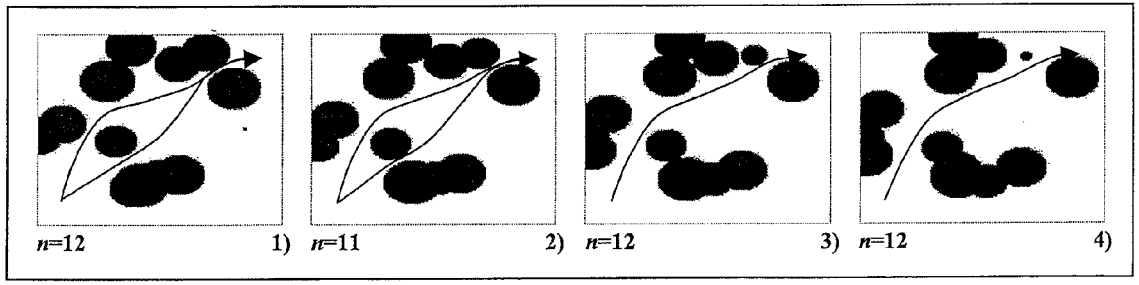
FIG. 10 shows another example of gradual deformation of the number and of the position of the objects with progressive appearance and disappearance; it is the same chain as in FIG. 9.

In FIG. 8, for the curve in thick line, the number of objects varies with progressive appearance and disappearance of the objects. For the diamonds, the number of objects varies with sudden appearance and disappearance of the objects—it is specified by FIG. 4. the 4 realizations are concentrated upon whose objective function values are circled in FIG. 8. This is precisely a case where the objective function exhibits a discontinuous behaviour when the ellipses appear and disappear suddenly. On the contrary, the evolution is continuous for progressive appearances and disappearances. The realizations in question are shown in FIG. 9 and FIG. 10. In FIG. 9 2), the sudden disappearance of an ellipse significantly enlarges the flow path from the injection well to the producing well. This realization is furthermore the one which, of the whole chain, provides the smallest objective function. This is not the case in FIG. 10 2), even though the size of the ellipse concerned has decreased. The latter continues to reduce in FIG. 10 3). In FIG. 10 4), it becomes so small that its effect is negligible and scenarios 9-4 and 10-4 are finally equivalent.

Successive Construction of Deformation Chains

As explained above at the end of section 2, it is possible, during a minimization process, to explore successively several chains, knowing that the initial realization for a chain is the optimum realization identified for the previous chain. The only difference in relation to what has been said in section 3 is that the truncated segments are also integrated in the construction of the segment of length $\lambda$.

The invention claimed is:

1. A method for deforming a model describing a heterogeneous underground zone comprising geologic objects including at least one of channels or fractures, and allowing a best simulation of a spatial configuration, of the geologic objects defined by physical quantities, that is constrained to measured dynamic data representative of fluid displacements in the underground zone, by imposing a continuity in evolution of the geologic objects comprising:

carrying out an iterative optimization process from realizations each including at least one of the geologic objects whose number is drawn from a Poisson random variable of determined mean and an objective function measuring a difference between the measured dynamic data and simulated dynamic data simulated by means of a flow simulator from a combined realization by adjustment of combination coefficients; and continuing the iterative optimization adjustment process until an optimum realization is obtained, wherein upon each iteration a combined realization is obtained by combination, of an initial realization of N1(t) geologic objects corresponding to a first mean value and of at least a second independent realization of a same model of N2(t) geologic objects corresponding to a second mean value, the combination is such that a number N(t) of geologic objects of the combination has a mean value equal to a sum of the first and of the second mean value, and for a same mean value of the combination, first and second mean values are varied concomitantly to gradually vary a number of the geologic objects for each of the combined realizations and a size of the geologic objects is associated with a procedure for generating the number of objects so as to make the geologic objects appear or disappear progressively, while gradually deforming the model describing the underground zone.

2. A method as claimed in claim 1, wherein:

the number N(t) of geologic objects of the combination of a mean $\lambda$ is related to the respective numbers of geologic objects Ni (i=1 . . . n) of the combined relations by a relation:

$$N(t)\{\lambda\} = \sum_{i=1}^{n} N_i\{a_i(t)\lambda\} \text{ with } \sum_{i=1}^{n} a_i = 1,$$

and $a_t(t)\lambda$ is a mean of variable $N_i$ at a time of the combination.

3. A method as claimed in claim 2, wherein for a combination involving only two realizations, trigonometric functions are selected for coefficients $a_1$, and $a_2$.

4. A method in according with claim 3 wherein:

the selected trigonometric functions for coefficients $a_1$ and $a_2$ are $a_1=\cos^2(t)$ and $a^2=\sin^2(t)$.

\* \* \* \* \*